(12) United States Patent
Richards et al.

(10) Patent No.: US 9,042,132 B2
(45) Date of Patent: May 26, 2015

(54) NOISE SUPPRESSION CIRCUIT FOR POWER ADAPTER

(75) Inventors: Peter W. Richards, San Francisco, CA (US); Steven Porter Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 13/280,885

(22) Filed: Oct. 25, 2011

(65) Prior Publication Data

US 2013/0099854 A1 Apr. 25, 2013

(51) Int. Cl.
*H02M 1/44* (2007.01)

(52) U.S. Cl.
CPC ........................................ *H02M 1/44* (2013.01)

(58) Field of Classification Search
CPC .......... H02M 1/12; H02M 1/44; Y02E 40/40; Y02B 70/126
USPC ................ 363/39–44; 327/551–559; 333/167
See application file for complete search history.

(56) References Cited

U.S. PATENT DOCUMENTS

| | | | |
|---|---|---|---|
| 3,868,606 A * | 2/1975 | Driscoll | ........................ 331/175 |
| 4,148,097 A * | 4/1979 | Deisch | ............................ 363/26 |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,528,970 B1 * | 3/2003 | Liu et al. | ........................ 320/107 |
| 6,643,148 B1 * | 11/2003 | Smyth | ........................ 363/21.01 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,521,990 B2 * | 4/2009 | Bybee | ........................... 327/552 |

(Continued)

FOREIGN PATENT DOCUMENTS

| | | |
|---|---|---|
| CN | 202004507 U | 10/2011 |
| DE | 20 2006 018439 U1 | 2/2007 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Adolf Berhane
*Assistant Examiner* — Yemane Mehari
(74) *Attorney, Agent, or Firm* — Morrison & Foerster LLP (57) ABSTRACT

A noise suppression circuit for a power adapter is disclosed. The noise suppression circuit can reduce or eliminate adapter-induced noise that could interfere with an electronic device powered by the adapter. In one example, the noise suppression circuit can include an active circuit to detect and attenuate or cancel the induced noise. In another example, the noise suppression circuit can include an RLC circuit in parallel with the adapter choke to suppress the induced noise at the operating frequencies of the powered electronic device. In still another example, the noise suppression circuit can include a modified adapter Y capacitor connection so as to bypass the adapter choke, thereby reducing or eliminating the choke's induced noise.

19 Claims, 5 Drawing Sheets

(56) References Cited

U.S. PATENT DOCUMENTS

| | | |
|---|---|---|
| 7,659,797 B2 | 2/2010 | Tucker |
| 7,663,607 B2 | 2/2010 | Hotelling et al. |
| 7,800,380 B1 | 9/2010 | Banaska et al. |
| 7,876,581 B2 * | 1/2011 | Kim et al. .......... 363/16 |
| 8,479,122 B2 | 7/2013 | Hotelling et al. |
| 2001/0015648 A1 | 8/2001 | Tokita |
| 2006/0026521 A1 | 2/2006 | Hotelling et al. |
| 2006/0197753 A1 | 9/2006 | Hotelling |
| 2008/0211310 A1 * | 9/2008 | Jitaru et al. .......... 307/72 |
| 2009/0002343 A1 | 1/2009 | Land et al. |
| 2010/0027599 A1 | 2/2010 | Di Chiro et al. |
| 2010/0289566 A1 | 11/2010 | Ko et al. |
| 2012/0314456 A1 * | 12/2012 | Lanni .......... 363/21.02 |

FOREIGN PATENT DOCUMENTS

| | | |
|---|---|---|
| EP | 1 355 408 A2 | 10/2003 |
| EP | 1 355 408 A3 | 10/2003 |
| JP | 61-224864 A | 10/1986 |
| JP | 09-27731 A | 1/1997 |
| JP | 2000-163031 A | 6/2000 |
| JP | 2002-342033 A | 11/2002 |
| JP | 2005-217839 A | 8/2005 |
| JP | 2008-029053 A | 2/2008 |
| JP | 2008-118424 A | 5/2008 |
| JP | 2009-177438 A | 8/2009 |
| WO | WO-2013/062686 A2 | 5/2013 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed Jul. 10, 2013, for PCT Application No. PCT/US2012/055657 filed Sep. 14, 2012, five pages.

Search Report for ROC (Taiwan), dated Jun. 11, 2014, for Patent Application No. 101135382, with English translation, two page.

Chinese Search Report dated Aug. 5, 2014, for CN Application No. 201210366607.2, filed Sep. 28, 2012, two pages.

* cited by examiner

NOISE SUPPRESSION CIRCUIT FOR POWER ADAPTER

FIELD

This relates generally to power adapters and more particularly to noise suppression circuits for power adapters.

BACKGROUND

Noise can be a persistent concern for electronic devices because the noise can come from a variety of sources (both internal and external) and can adversely affect the devices' desired signals. In some circumstances, the noise can be related to the power adapters used to power the electronic devices.

Figure 1A:
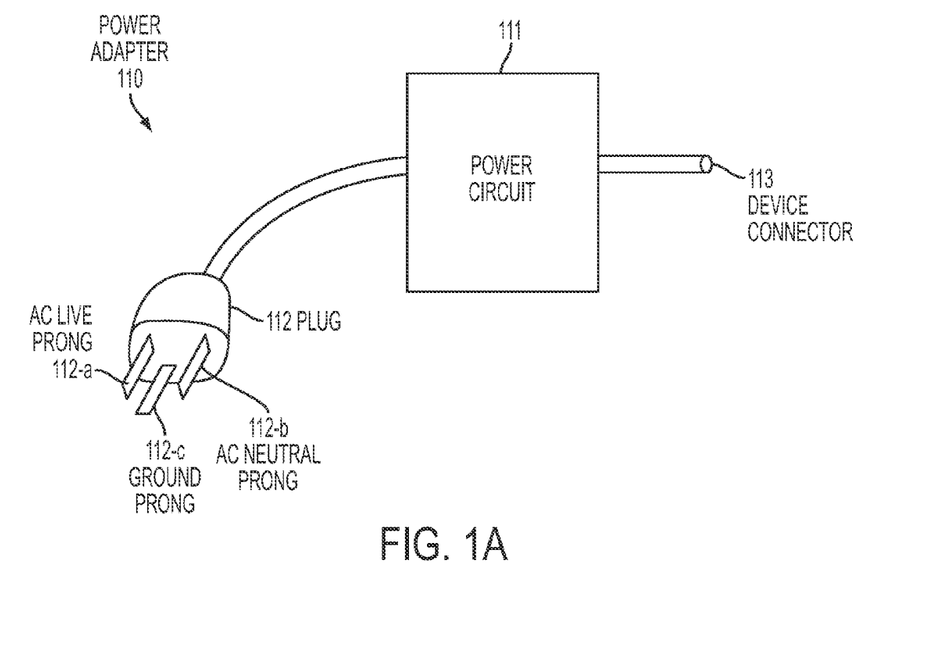
FIGS. 1A and 1B illustrate exemplary power adapters that can be used to power electronic devices according to various embodiments.
Figure 1B:
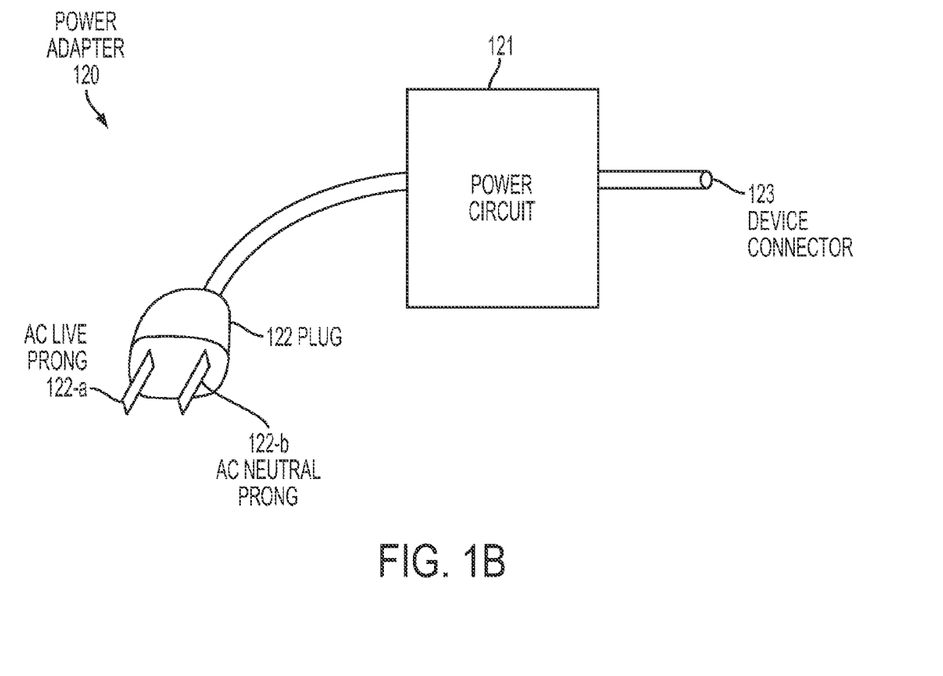

FIGS. 1A and 1B illustrate two types of power adapters that are typically used to power electronic devices. In the example of FIG. 1A, "Type B" power adapter 110 can include plug 112 to plug into a power source, e.g., a wall outlet, to receive a voltage, e.g., AC voltage. The plug 112 can have three prongs, including live voltage prong 112-a, neutral prong 112-b, and ground prong 112-c. The adapter 110 can also include connector 113 to connect to an electronic device to send a voltage, e.g., DC voltage, to power the device. The adapter 110 can further include power circuit 111 to receive the voltage from the power source via the plug 112, transform the received voltage into a voltage that is compatible with the connected device, and send the compatible voltage to the device via the connector 113. In the example of FIG. 1B, "Type A" power adapter 120 can be the same as the Type B adapter 110, except Type A adapter plug 122 has two prongs rather than three. The two prongs of the plug 122 can include live voltage prong 122-a and neutral prong 122-b. The Type A adapter's power circuit 121 can receive voltage from a power source via the plug 122, transform the received voltage into a voltage compatible with a connected electronic device, and send the compatible voltage to the device via connector 123 to power the device.

As the Type B adapter 110 has ground prong 112-c that can couple to earth ground, noise induced in the adapter can be shunted to ground rather than into components of a connected electronic device. On the other hand, the Type A adapter 120 does not have a ground prong and therefore can induce noise that can be introduced into the connected electronic device that the adapter powers.

Because many electronic devices use the Type A adapter, the challenge is to suppress induced noise in those devices while using that adapter.

SUMMARY

This relates to a noise suppression circuit for a power adapter to reduce or eliminate adapter-induced noise from being introduced into an electronic device powered by the adapter. This noise suppression circuit can be particularly helpful with power adapters, e.g., Type A adapters, which lack a ground prong in the adapter plug that could advantageously handle induced noise. In one example, the noise suppression circuit can include an active circuit to detect and attenuate or cancel the induced noise. In another example, the noise suppression circuit can include an RLC circuit in parallel with the adapter choke to suppress the induced noise at the operating frequencies of the connected electronic device. In still another example, the noise suppression circuit can include a modified adapter Y capacitor connection so as to bypass the adapter choke, thereby reducing or eliminating the choke's induced noise. By using a noise suppression circuit for a power adapter, electronic devices can operate properly with the power adapter because the devices' desired signals carry little or no adapter-induced noise that would interfere with the devices' operation.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to a noise suppression circuit for a power adapter that can be used to suppress adapter-induced noise that adversely affects desired signals in a device powered by the adapter. In some embodiments, the noise suppression circuit can include an active circuit to detect and attenuate or cancel the induced noise in the adapter. In some embodiments, the noise suppression circuit can include an RLC tuned circuit in parallel with the adapter choke to suppress the choke's induced noise at the operating frequencies of the connected electronic device. Alternatively, the RLC tuned circuit can be in parallel with the adapter Y capacitor to similarly suppress the capacitor's induced noise at the operating frequencies of the connected electronic device. In some embodiments, the noise suppression circuit can include a modified connection for the adapter Y capacitor so as to bypass the adapter choke, thereby reducing or eliminating the choke's induced noise.

By providing noise suppression circuitry in the power adapter, the adapter can suppress induced noise that would otherwise be introduced into desired signals of the device powered by the adapter. A power adapter with noise suppression circuitry can be particularly useful when powering touch sensitive devices because the devices depend on sense signals, which can be very sensitive to noise, to perform various functions on the devices.

Although various embodiments herein describe AC power adapters, it is to be understood that other types of adapters are also possible candidates for noise suppression.

Figure 2:
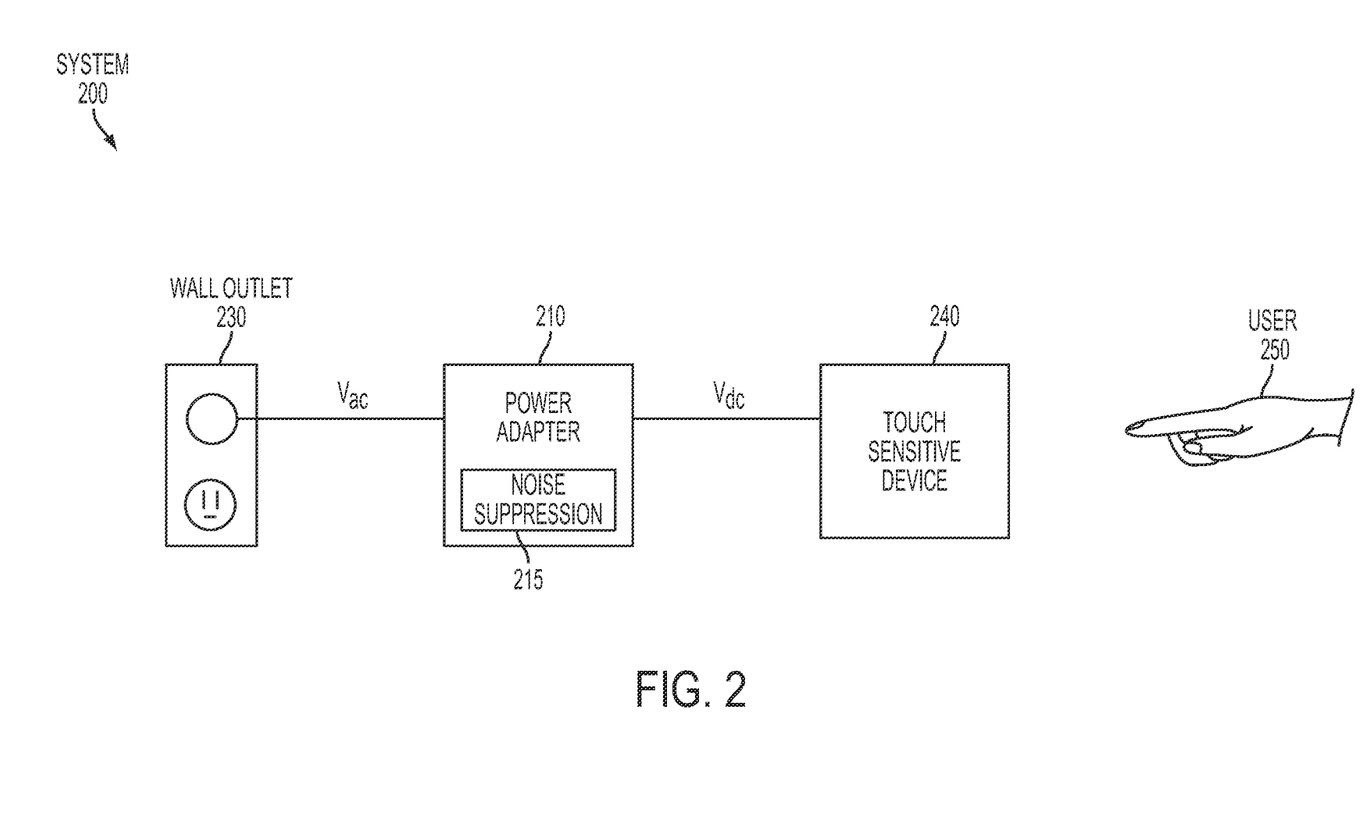
FIG. 2 illustrates an exemplary power system having a power adapter coupled to a touch sensitive device according to various embodiments.

FIG. 2 illustrates an exemplary power system having a touch sensitive device powered by an adapter with a noise suppression circuit according to various embodiments. In the example of FIG. 2, power system 200 can include power adapter 210 plugged into wall outlet 230 to receive AC voltage Vac and connected to touch sensitive device 240 to send DC voltage Vdc to power the device. The power adapter 210 can be a Type A adapter or any other adapter that lacks a ground prong according to various embodiments. The touch sensitive device 240 can detect an object, e.g., user's hand 250, proximate to the device, generate a sense signal indicative of the object's proximity, and perform various functions based on the sense signal.

When the touch sensitive device 240 is connected to a power adapter 210 that lacks a ground prong, e.g., a Type A adapter, the device can be vulnerable to noise induced by the adapter that can interfere with the sense signals. The touch sensitive device 240 can generate stimulation signals to stimulate drive circuitry (not shown) to drive the device. In response to the stimulation signals, sense circuitry (not shown) of the touch sensitive device 240 can generate sense signals, where the relative strength of the sense signals can be a function of the proximity of the object to the device. The induced noise in the adapter 210 can be introduced directly into the sense signals due to the noise being on the system's isolated DC ground (to which the sense signals are referenced) relative to the user, causing the noise to couple to the generated sense signals. The resulting sense signals can be erroneous, thereby causing the touch sensitive device 240 to perform an erroneous function based on the noisy sense signals. In some embodiments, the noise in the sense signals can be exacerbated by a poorly grounded object, such as the user's hand 250, touching or hovering over the touch sensitive device 240 at multiple locations.

Noise suppression circuit 215 for the power adapter 210 can suppress that induced noise so that its interference with the sense signals is reduced or eliminated. Exemplary noise suppression circuits will be described in detail in FIGS. 3 through 5.

Although various embodiments herein refer to touch sensitive devices, it is to be understood that other electronic devices can also be used with a noise suppression circuit for a power adapter.

Figure 3:
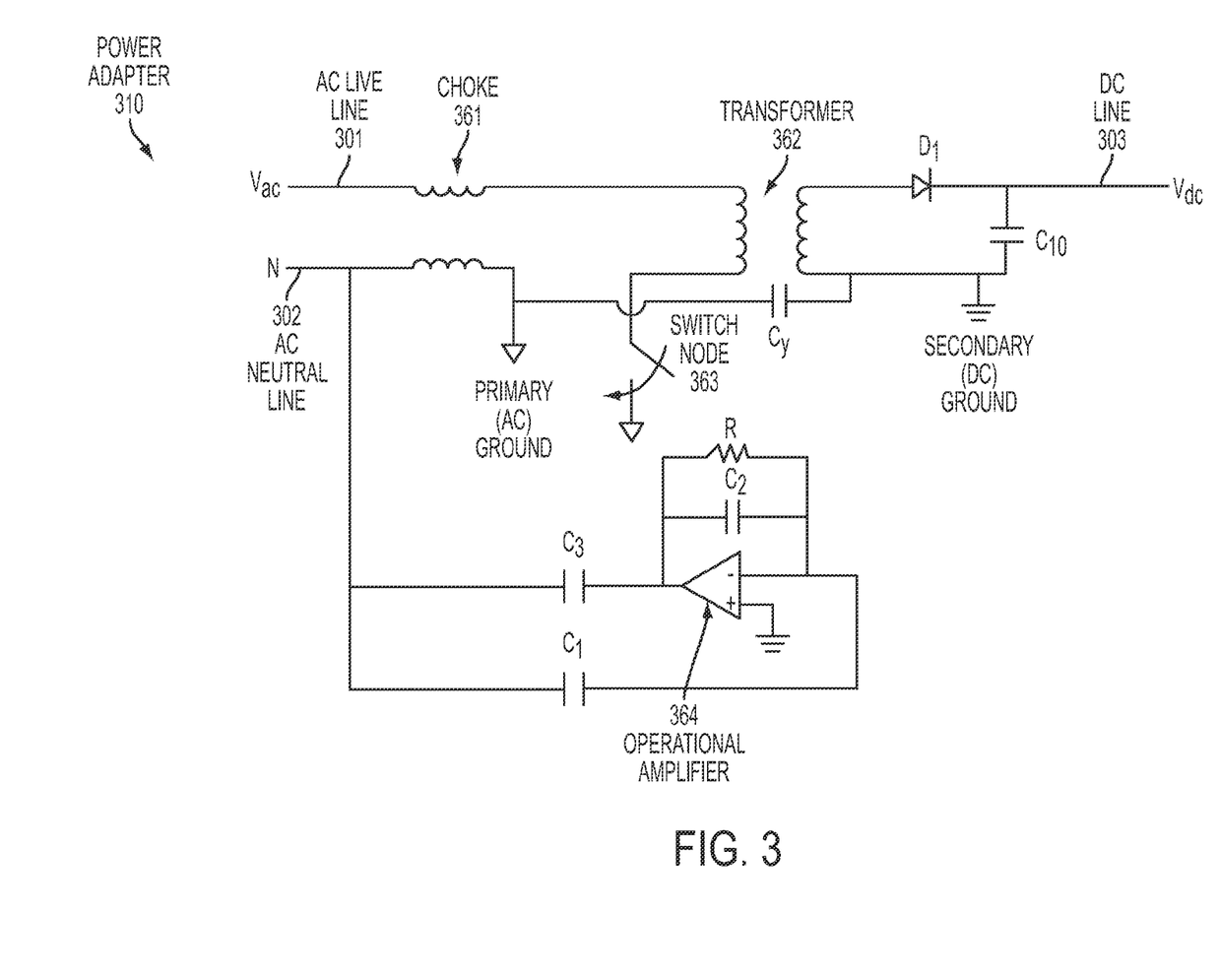
FIG. 3 illustrates an exemplary power adapter noise suppression circuit having a feedback circuit according to various embodiments.

FIG. 3 illustrates an exemplary noise suppression circuit that can be used in the system of FIG. 2. In the example of FIG. 3, power adapter 310 can include a power circuit to supply power to touch sensitive device 240 and a noise suppression circuit to suppress noise that could interfere with the device's sense signals. The power circuit can be a switched-mode power circuit, including AC live voltage line 301 to supply AC live voltage Vac from wall outlet 230, AC neutral line 302 coupled to AC neutral of the wall outlet, choke 361 to suppress electromagnetic interference (EMI) emissions from the adapter, switching node 363 to help regulate the AC voltage Vac, transformer 362 to transfer the AC voltage Vac between primary and secondary sides of the power circuit, Y capacitor Cy to further suppress EMI emissions and to act as a safety element to attenuate stray voltages, rectifier diode D1 to convert the AC voltage Vac to DC voltage Vdc, capacitor C10 to smooth the DC voltage Vdc, and DC voltage line 303 to transmit the DC voltage Vdc to the touch sensitive device to power the device. The power circuit can couple to primary AC ground (illustrated by a triangle) on the primary side of the adapter 310 and to secondary DC ground (illustrated by parallel horizontal lines) on the secondary side of the adapter. The choke 361 and the Y capacitor Cy can induce noise that can propagate through the adapter 310 and the touch sensitive device 240 so as to interfere with the device's sense signals. In some embodiments, the noise induced in the choke 361 and the Y capacitor Cy can be due in part to parasitic capacitances at the switching node 363 in the adapter 310 or parasitic winding capacitances at the transformer 362 in the adapter that can appear as noise at the choke and the Y capacitor.

The noise suppression circuit for the adapter 310 can employ active noise suppression to suppress induced noise in the adapter. To do so, the noise suppression circuit can include an active circuit, e.g., a feedback circuit, acting as a capacitance multiplier (capacitor C1 and operational amplifier 364) to effectively detect the induced noise, and a feedback capacitor (capacitor C3) to effectively feed back the detected noise so as to attenuate or cancel the noise between the primary ground and the secondary ground. The noise suppression circuit can be coupled to the AC neutral line 302 at a point where the AC voltage Vac is clean, i.e., relatively free of induced noise, and to the secondary side output of the transformer 362 at the noisy secondary side ground via the (+) input to the operational amplifier 364. The capacitance multiplier can include capacitor C1 and operational amplifier 364 with resistor R and capacitor C2, where the capacitor C1, with the help of the operational amplifier, can simulate a larger capacitor so as to sense the induced noise in the AC voltage Vac by sensing the differential voltage between the primary side ground and secondary side ground. There can a tendency for the AC voltage Vac at the secondary side to be higher than at the primary side, indicative of the induced noise. Accordingly, feedback capacitor C3 can feed back a current (including the induced noise) so as to reduce that differential voltage and, in the process, to couple the feedback noise into the AC voltage so as to attenuate or cancel out noise induced by the choke 361 and the Y capacitor Cy.

In operation, the power adapter 310 can receive AC voltage Vac from a power source, e.g., a wall outlet, transmit the AC voltage Vac through the choke 361, the transformer 362, the switching node 363, the Y capacitor Cy, the rectifier diode D1, and the smoothing capacitor C10 to process and convert the AC voltage Vac to DC voltage Vdc as described previously, and send the DC voltage Vdc to a connected touch sensitive device to power the device. While transmitting the AC voltage Vac, the power adapter 310 can also actively suppress induced noise in the AC voltage Vac using the active circuit as described previously so that the secondary DC ground provided to the connected touch sensitive device has little or no noise that could interfere with the device's sense signals. In some embodiments, the noise suppression circuit can include the capacitor C1 having a capacitance of about 220 pF, the operational amplifier 364, a gain-bandwidth product of about 12 MHz and a slew rate of about 400V/µs, the amplifier resistor R, a resistance of about 100 kΩ, the amplifier capacitor C2, a capacitance of about 47 pF, and the feedback capacitor C3, a capacitance of about 220 pF. The feedback current can be about 2 mA, at a peak voltage Vpk of about 5V and the touch frequency of about 300 kHz. Accordingly, at a touch frequency of 100 kHz, the noise suppression circuit can suppress induced noise in the adapter 310 by as much as 30 dB and, at a touch frequency of 300 kHz, by as much as 10 dB.

It should be understood that the power adapter 310 of FIG. 3 has been simplified for explanatory purposes, but can include additional and/or other components capable of powering an electronic device and suppressing noise according to various embodiments.

Figure 4:
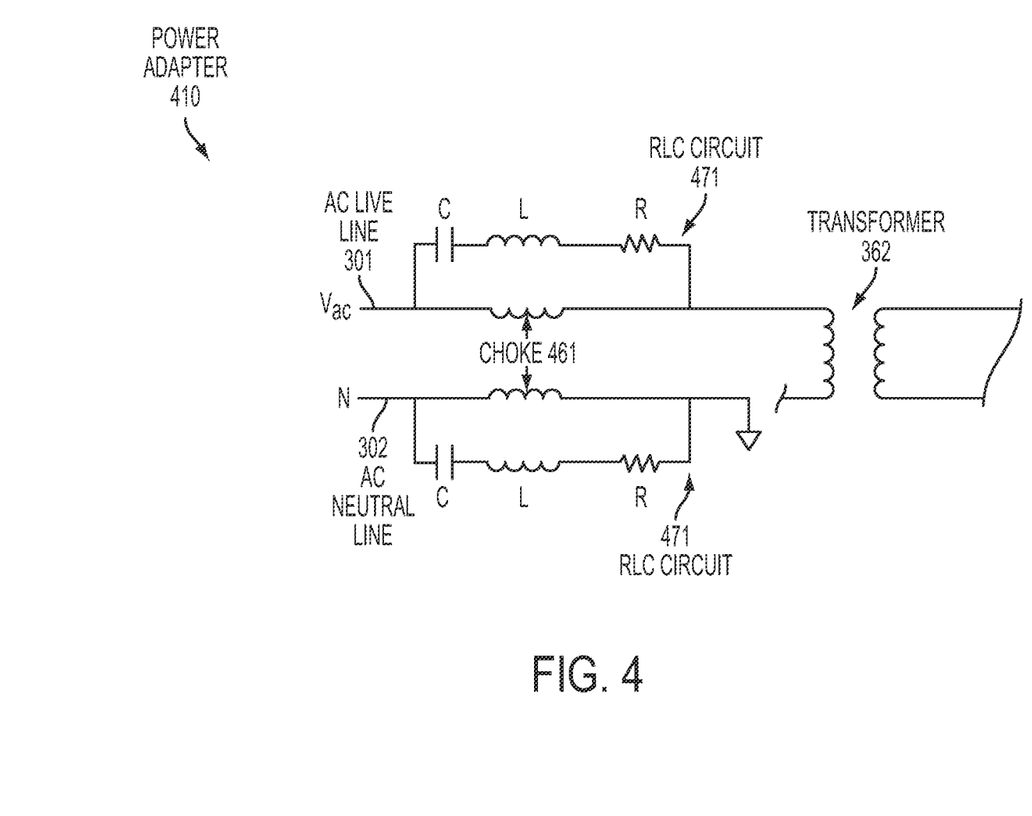
FIG. 4 illustrates an exemplary power adapter noise suppression circuit having an RLC tuned circuit in parallel with a choke according to various embodiments.

FIG. 4 illustrates another exemplary noise suppression circuit that can be used in the system of FIG. 2. In the example of FIG. 4, the noise suppression circuit for power adapter 410 can employ selective frequency filtering to select particular frequencies for induced noise suppression. In some embodiments, the selected frequencies can coincide with the frequencies of the stimulation signals used by the touch sensitive device 240 for driving the device to sense a proximate object and to generate sense signals indicative thereof. The power adapter 410 can include choke 461 to suppress EMI emissions, as described previously in FIG. 3. To suppress EMI emissions, the choke 461 can have higher impedance to block higher frequency signals (which the EMI signals are) while passing lower frequency signals. However, at the same time, the choke 461 can induce substantial noise in the AC voltage Vac that can interfere with the connected touch sensitive device's sense signals. On the other hand, if the choke 461 were operated at low or zero impedance, the noise induced by the choke can be reduced significantly. However, at such impedance, the choke's EMI suppression can degrade.

The noise suppression circuit of FIG. 4 can balance EMI suppression with noise suppression at the choke so as to reduce noise at the connected touch sensitive device's sense signals without substantially degrading EMI suppression. To do so, the noise suppression circuit can include RLC circuit 471 having resistor R, inductor L, and capacitor C in parallel with the choke 461. The RLC circuit 471 can provide, at the selected frequencies, in effect a low choke impedance in parallel with the choke 461 so as to reduce induced noise at the selected frequencies, i.e., the operating frequencies for the touch sensitive device. At the other frequencies, the RLC circuit 471 can have little effect such that the choke 461 can perform normal EMI suppression. Accordingly, at the selected frequencies, the lower choke impedance can be used to avoid inducing noise in the AC voltage Vac, while at the other frequencies where induced noise is not at issue for the touch sensitive device, the higher choke impedance can effectively suppress EMI emissions.

The power circuit of the adapter 410 of FIG. 4 can be the same as the power circuit of the adapter 310 of FIG. 3, having (in addition to the illustrated components) the switching node 363, the Y capacitor Cy, the rectifier diode D1, the smoothing capacitor C10, and the DC voltage line 303.

In operation, the power adapter 410 can operate in a similar manner as the power adapter 310 of FIG. 3 to convert the AC voltage Vac to the DC voltage Vdc. While transmitting the AC voltage Vac, the power adapter 410 can also suppress induced noise in the AC voltage Vac using the RLC circuit as described previously so that the DC voltage Vdc sent to the connected touch sensitive device has little or no noise that could interfere with the device's sense signals. In some embodiments, the RLC circuit 471 can be tuned to suppress noise in the narrow touch frequency band of 100-300 kHz. For example, the RLC circuit resistor R can have a resistance of about 3.6 kΩ, the inductor L, an inductance of about 3.8 mH, and the capacitor C, a capacitance of about 73 pF. The RLC circuit 471 can provide, at the selected frequencies of 100-300 kHz, a lower choke impedance that is about 5 times lower than an existing choke impedance at the 9.6 mH choke. According, at the selected frequencies, the noise suppression circuit can suppress induced noise in the adapter 410 by as much as 10 dB.

In an alternate embodiment, rather than having the RLC circuit in parallel with the choke, the RLC circuit can be in parallel with the Y capacitor Cy, which can also induce noise that could interfere with the sense signals, to help suppress the Y capacitor induced noise in a similar manner as the choke.

In another alternate embodiment, a first RLC circuit can be in parallel with the choke to help suppress the choke's induced noise, and a second RLC circuit can be in parallel with the Y capacitor to help suppress the Y capacitor's induced noise.

Figure 5:
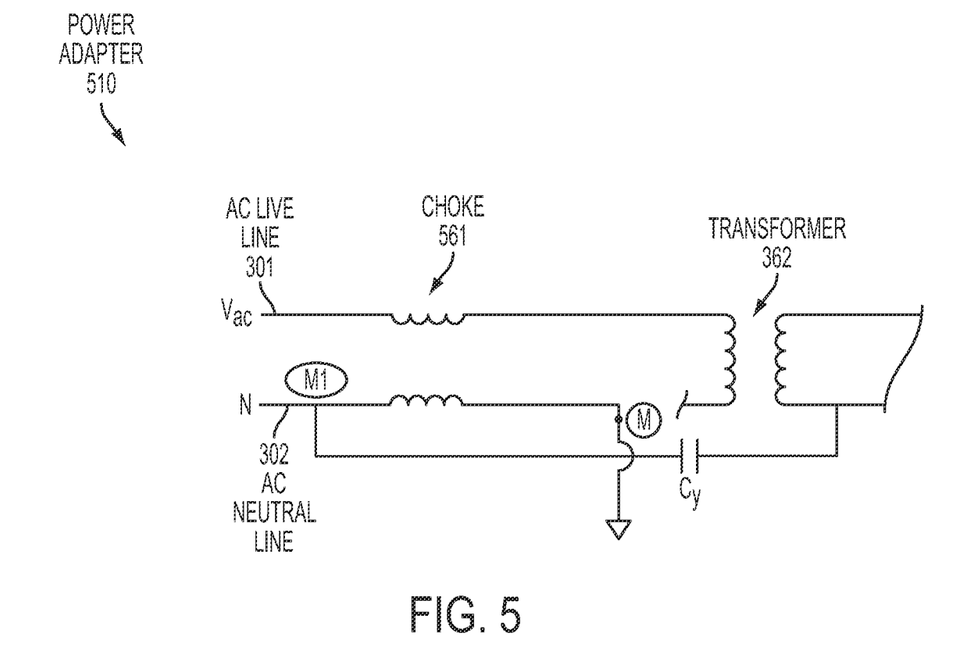
FIG. 5 illustrates an exemplary power adapter noise suppression circuit having a modified connection for a Y capacitor according to various embodiments.

FIG. 5 illustrates another exemplary noise suppression circuit that can be used in the system of FIG. 2. In the example of FIG. 5, the noise suppression circuit of power adapter 510 can employ a modified connection for Y capacitor Cy to suppress induced noise in the adapter. Rather than couple the Y capacitor Cy at the primary AC ground as in FIG. 3 (illustrated by point (M)), the Y capacitor can be coupled to the AC neutral line 502 upstream of choke 561 at a point where the AC voltage Vac is relatively free of induced noise (illustrated by point (M')). This can effectively bypass the choke 561, thereby reducing the choke's induced noise contribution to the AC voltage Vac.

The power circuit of the adapter 510 of FIG. 5 can be the same as the power circuit of the adapter 310 of FIG. 3, having (in addition to the illustrated components) the switching node 363, the rectifier diode D1, the smoothing capacitor C10, and the DC voltage line 303.

In operation, the power adapter 510 can operate in a similar manner as the power adapter 310 of FIG. 3 to convert the AC voltage Vac to the DC voltage Vdc. While transmitting the AC voltage Vac, the power adapter 510 can also suppress induced noise in the AC voltage Vac using the modified Y capacitor Cy connection to bypass the choke 561 as described previously so that the DC voltage Vdc sent to the connected touch sensitive device has little or no noise that could interfere with the device's sense signals. In some embodiments, the modified Y capacitor Cy can have a capacitance of about 2200 pF. Accordingly, at touch frequencies between 100-300 kHz, the noise suppression circuit can suppress induced noise in the adapter 510 by as much as 10 dB.

In addition to suppressing noise in sense signals, a noise suppression circuit according to various embodiments can be used for certain kinds of EMI suppression, audio signal noise suppression, video signal noise suppression, and the like.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A noise suppression circuit for a power adapter comprising:
an operational amplifier coupled between an alternating current (AC) neutral line on a first side of the adapter and a direct current (DC) ground line on a second side of the adapter, the first side of the adapter and the second side of the adapter separated by a transformer, wherein:
an output and a first input of the operational amplifier are coupled to the AC neutral line,
a second input of the operational amplifier is coupled to the DC ground line, and
the operational amplifier is configured to cause current to flow from the DC ground line to the AC neutral line, or from the AC neutral line to the DC ground line, based on a noise between the AC neutral line and the DC ground line so as to attenuate the noise between the AC neutral line and the DC ground line, the noise being induced into a DC line on the second side of the adapter.

2. The circuit of claim 1, wherein the operational amplifier is configured to cause the current to flow by detecting the noise between the AC neutral line and the DC ground line and using the detected noise to control the current flow from the DC ground line to the AC neutral line or from the AC neutral line to the DC ground line.

3. The circuit of claim 2, further comprising:
a capacitance multiplier configured to detect the noise; and
a feedback capacitor configured to control the current flow so as to attenuate the noise between the AC neutral line and the DC ground line.

4. The circuit of claim 3, wherein the capacitance multiplier comprises:

a sense capacitor configured to simulate a larger capacitance so as to detect the noise, wherein operational amplifier is coupled to the sense capacitor to help simulate the larger capacitance in the sense capacitor.

5. The circuit of claim 1, wherein the operational amplifier is coupled to a transformer output on the second side.

6. The circuit of claim 1, wherein the operational amplifier is coupled to the first side at a first point where the adapter voltage is substantially free of the induced noise and to the second side at a second point where the adapter voltage has the induced noise.

7. A noise suppression circuit for a power adapter comprising:
an RLC circuit in parallel with a component of the adapter, the RLC circuit and the component being on a first side of the adapter, the RLC circuit configured to suppress noise induced in the component at select frequencies of an adapter voltage on a second side of the adapter, wherein:
the first side of the adapter and the second side of the adapter are separated by a transformer, and
the RLC circuit comprises:
a first resistor, a first inductor and a first capacitor in parallel with the component and coupling an AC live line on a first side of the component and a second side of the component, and
a second resistor, a second inductor and a second capacitor in parallel with the component and coupling an AC neutral line on a first side of the component and a second side of the component.

8. The circuit of claim 7, wherein the component of the adapter is a choke, the choke inducing the noise.

9. The circuit of claim 8, wherein the RLC circuit is configured to lower choke impedance at the select frequencies so as to suppress the induced noise at the select frequencies.

10. The circuit of claim 7, wherein the component of the adapter is a Y capacitor, the Y capacitor inducing the noise.

11. The circuit of claim 7, wherein the select frequencies coincide with operating frequencies of an electronic device powered by the adapter.

12. The circuit of claim 1, wherein the first input comprises an inverting input of the operational amplifier, and the second input comprises a non-inverting input of the operational amplifier.

13. A power adapter for noise suppression comprising:
a plug configured to connect to a power source;
a connector configured to connect to a device;
a power circuit configured to receive a first voltage from the power source, to transform the first voltage into a second voltage compatible with the device, and to send the second voltage to the device to power the device; and
a noise suppression circuit configured to suppress noise induced in the power circuit, the noise suppression circuit comprising;
an operational amplifier coupled between an alternating current (AC) neutral line on a first side of the adapter and a direct current (DC) ground line on a second side of the adapter, the first side of the adapter and the second side of the adapter separated by a transformer, wherein:
an output and a first input of the operational amplifier are coupled to the AC neutral line,
a second input of the operational amplifier is coupled to the DC ground line, and
the operational amplifier is configured to cause current to flow from the DC ground line to the AC neutral line, or from the AC neutral line to the DC ground line, based on a noise between the AC neutral line and the DC ground line so as to attenuate the noise between the AC neutral line and the DC ground line, the noise being induced into a DC line on the second side of the adapter.

14. The adapter of claim 13, wherein the device comprises a touch sensitive device configured to sense a proximity of an object to the device and to perform an action based on a sense signal indicative of the sensed proximity.

15. The adapter of claim 14, wherein the noise suppression circuit is configured to suppress the induced noise so as to avoid adversely affecting the sense signal.

16. A system for noise suppression comprising:
an electronic device configured to generate signals; and
a power adapter configured to power the electronic device, the adapter lacking a plug ground prong and including a noise suppression circuit configured to suppress noise induced in the adapter from interfering with the generated signals of the device, the noise suppression circuit comprising:
an operational amplifier coupled between an alternating current (AC) neutral line on a first side of the adapter and a direct current (DC) ground line on a second side of the adapter, the first side of the adapter and the second side of the adapter separated by a transformer, wherein:
an output and a first input of the operational amplifier are coupled to the AC neutral line,
a second input of the operational amplifier is coupled to the DC ground line, and
the operational amplifier is configured to cause current to flow from the DC ground line to the AC neutral line, or from the AC neutral line to the DC ground line, based on a noise between the AC neutral line and the DC ground line so as to attenuate the noise between the AC neutral line and the DC ground line, the noise being induced into a DC line on the second side of the adapter.

17. The system of claim 16, wherein the electronic device is a touch sensitive device configured to generate sense signals indicative of a proximity of an object to the touch sensitive device, and
wherein the noise suppression circuit is configured to suppress the induced noise and prevent the induced noise from interfering with the sense signals.

18. The system of claim 16, wherein the electronic device is an audio device configured to generate audio signals for listening by a user, and
wherein the noise suppression circuit is configured to suppress the induced noise and prevent the induced noise from interfering with the audio signals.

19. The system of claim 16, wherein the electronic device is a video device configured to generate video signals for viewing by a user, and
wherein the noise suppression circuit is configured to suppress the induced noise and prevent the induced noise from interfering with the video signals.

* * * * *